Dec. 22, 1959 D. J. BURKE 2,917,773
PLASTIC MOLDING MACHINE
Filed Dec. 6, 1955 4 Sheets-Sheet 1

INVENTOR.
DONALD J. BURKE
BY
Oberlin & Limbach
ATTORNEYS.

Dec. 22, 1959 D. J. BURKE 2,917,773
PLASTIC MOLDING MACHINE

Filed Dec. 6, 1955 4 Sheets-Sheet 2

INVENTOR.
DONALD J. BURKE
BY
Oberlin & Limbach
ATTORNEYS.

Dec. 22, 1959   D. J. BURKE   2,917,773
PLASTIC MOLDING MACHINE
Filed Dec. 6, 1955   4 Sheets-Sheet 3
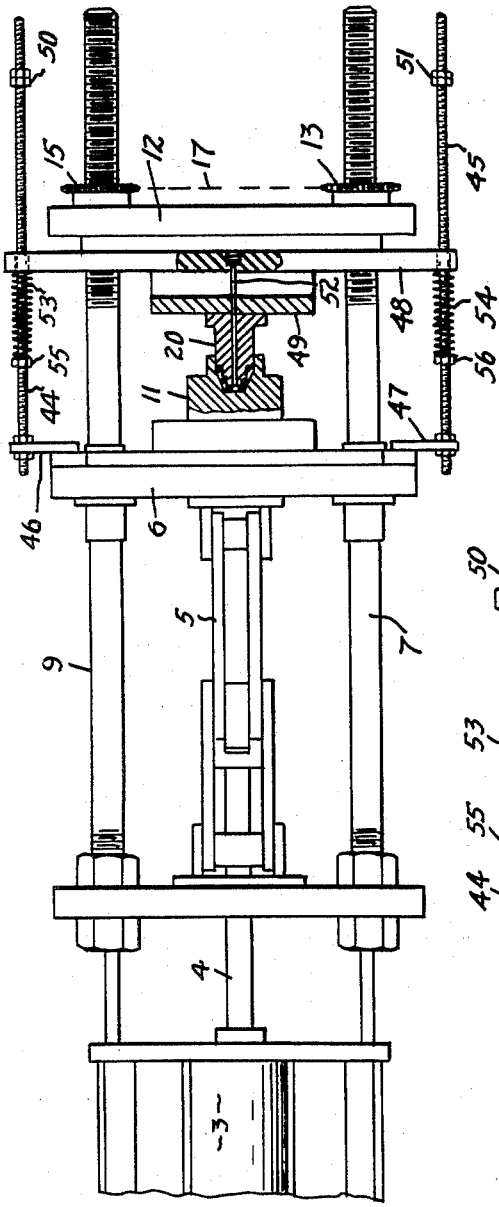
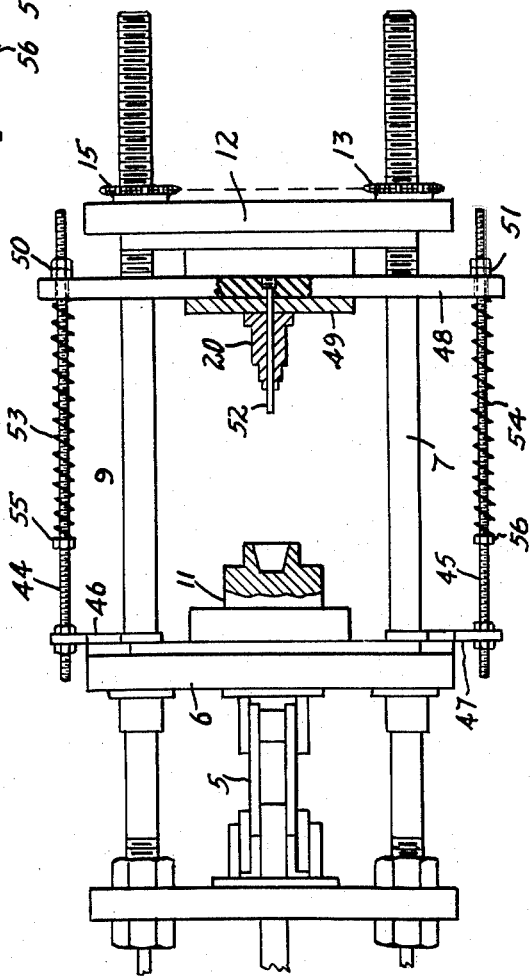
INVENTOR.
DONALD J. BURKE
BY
Oberlin & Limbach
ATTORNEYS.

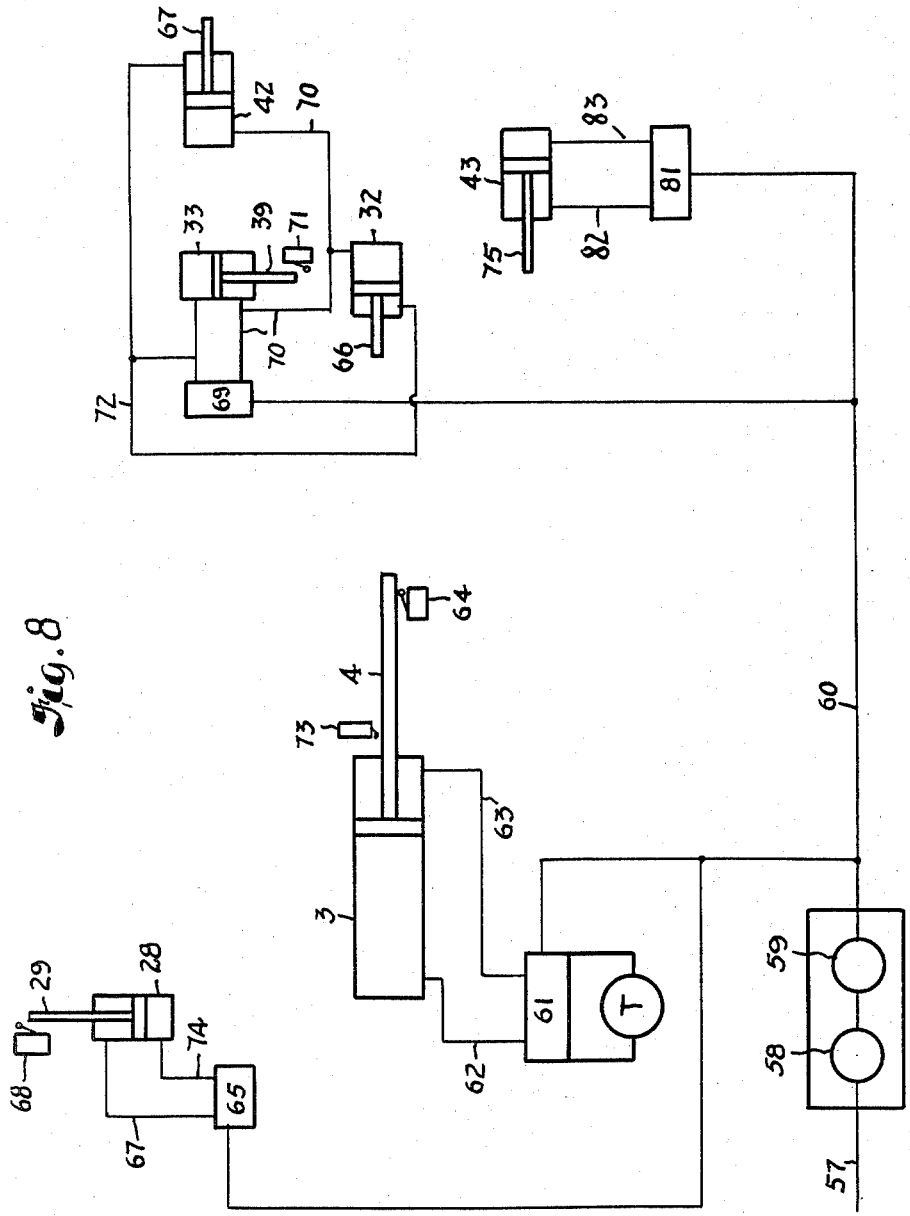

United States Patent Office 2,917,773
Patented Dec. 22, 1959

2,917,773

PLASTIC MOLDING MACHINE

Donald J. Burke, East Cleveland, Ohio, assignor to Erico Products, Inc., Cleveland, Ohio, a corporation of Ohio Application December 6, 1955, Serial No. 551,388

7 Claims. (Cl. 18—5)

This invention relates as indicated to a novel plastic molding machine, and more particularly to a machine adapted to utilize the molding material in the form of a continuous elongated preformed "rope" of the type disclosed and claimed in my co-pending application Serial No. 531,734, filed August 31, 1955.

As explained in such prior application, there has recently been greatly increased use of reinforced plastic molding materials, particularly the thermosetting synthetic plastics which may be reinforced with filaments such as sisal, cotton string and glass fiber, the latter usually being preferred. In accordance with the present invention, I provide a machine adapted automatically intermittently to advance such plastic rope and to utilize the leading end portion of the latter in successive molding operations. Such machine may be left untended for long periods of time, attention ordinarily being required only when the supply of molding material becomes exhausted.

It is accordingly a principal object of my invention to provide a novel molding machine adapted to utilize continuous lengths of plastic molding material, particularly reinforced plastic material in the form of a continuous "rope" or the like.

A further object is to provide such machine wherein the operation may be fully automatic and require a minimum of attention.

Other objects of the invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

Fig. 6 is a top plan view showing the mold elements in molding position partly broken away to show the operation of the stripping mechanism;

Fig. 7 is a view similar to Fig. 6 but with the mold open;

Fig. 8 is a fluid pressure diagram of a suitable pneumatic system for operating the machine.

Figure 1:
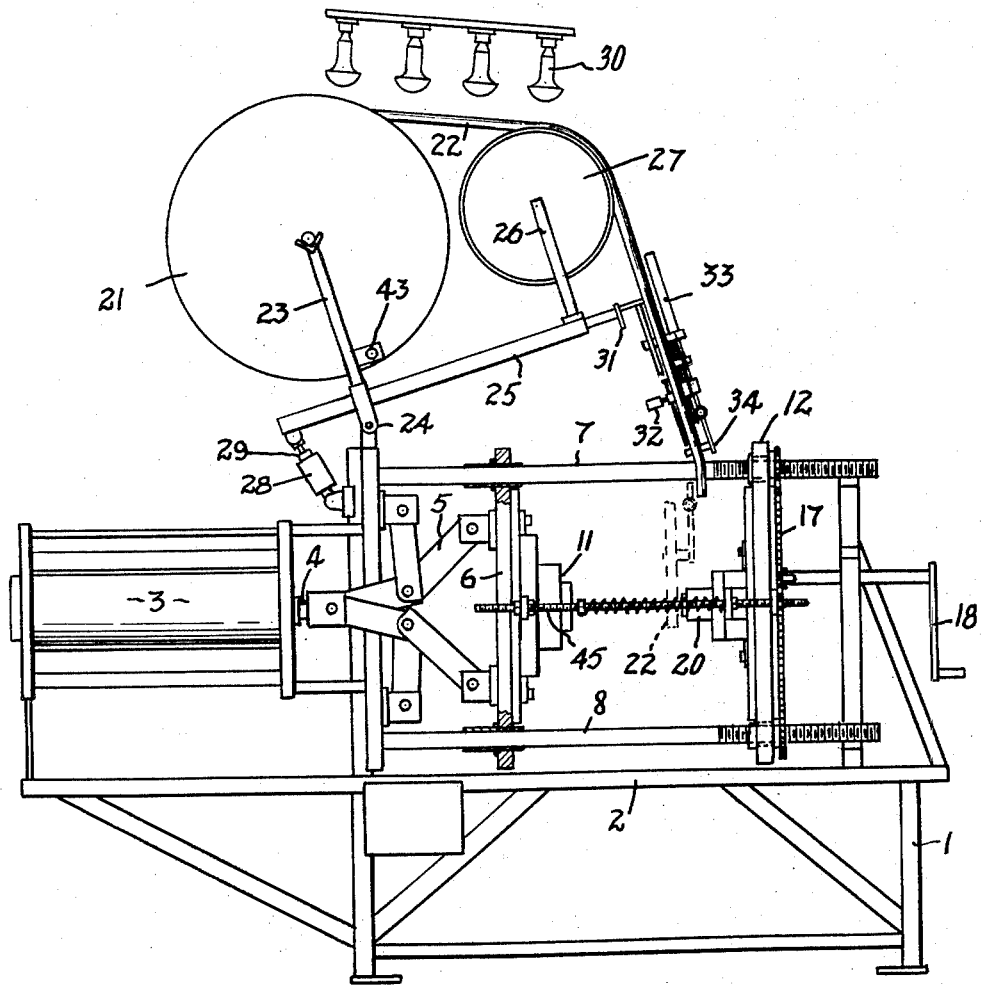
Fig. 1 is a side elevation of a machine embodying the principles of my invention.
Figure 9:
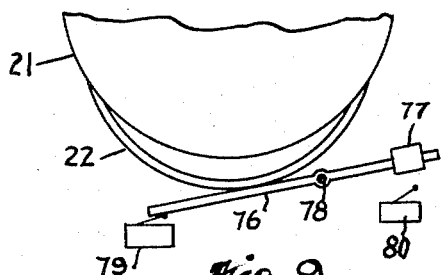
Fig. 9 is a semi-diagrammatic illustration of the mechanism for controlling rotation of the reel.

Referring now more particularly to Fig. 1 of the drawing, the embodiment of the invention there illustrated comprises a frame 1 supporting a table 2 carrying a horizontally mounted fluid pressure cylinder 3. The rod 4 of the piston reciprocable in such cylinder is connected through the usual toggle link system 5 with a mold platen 6 mounted for reciprocation along four horizontal bars or rails 7, 8, 9 and 10. As shown in such drawing, platen 6 may support a female mold 11. A second platen 12 is likewise mounted on such bars by means of rotatable bushings 13, 14, 15 and 16 having sprocket teeth engaging a continuous chain 17. Such bushings threadedly engage the bars so that when they are rotated in unison, the platen 12 may be adjustably located as desired. A hand crank 18 drives sprocket 19 in turn to drive chain 17 thus to rotate such bushings.

A male mold 20 is mounted on platen 12 for co-operation with mold 11 and stripping mechanism is provided in conjunction therewith as described below. It will, of course, be appreciated that various cooperating mold members may be thus provided as desired and a plurality of such molds may be mounted on the platens 6 and 12.

Figure 2:
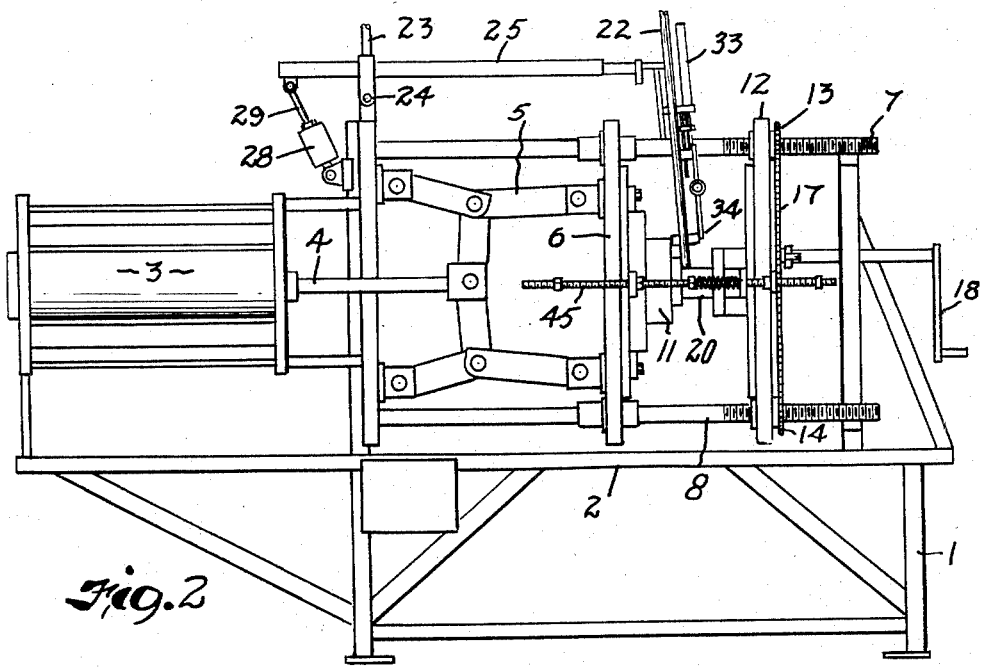
Fig. 2 is a view similar to Fig. 1 but showing the parts in molding position.
Figure 3:
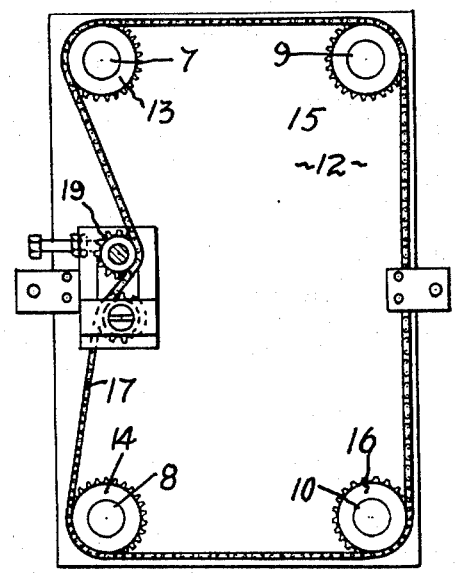
Fig. 3 is a view of the adjustable mold platen on an enlarged scale showing the mechanism for reciprocating the latter.

A reel 21 of continuous plastic molding material in the form of a rope 22 is rotatably supported upon standard 23 pivotally mounted at 24 on the frame of the molding machine for oscillatory movement about a horizontal axis transversely of the machine. A beam 25 rigid with standard 23 supports a second standard 26 at its end carrying a pulley 27 over which the plastic rope 22 is adapted to pass. A fluid pressure cylinder 28 is pivotally mounted on the machine frame and the upwardly projecting piston 29 is pivotally connected to the other end of beam 25 so that upon energization of such piston-cylinder assembly, beam 25 together with reel 21 and pulley 27 may be rocked back and forth about pivot 24. In this manner, beam 25 may be elevated as shown in Fig. 1 and depressed as shown in Fig. 2. A battery of infrared lamps 30 may optionally be located closely above the plastic rope 22 where the latter passes from reel 21 to pulley 27 in order partially to preheat the molding material. Considerable care must be taken to avoid heating any portion of the latter to the setting stage.

Figure 4:
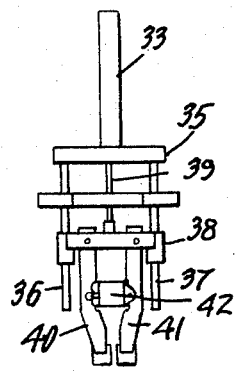
Figs. 4 and 5 show the plastic rope gripping and advancing means in two positions of the same.
Figure 5:
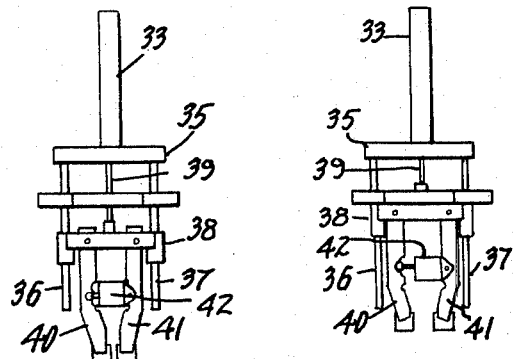

The lower end portion of the rope 22 is adapted to dangle downwardly from pulley 27 into position to be pinched off between the mold parts when platen 6 is reciprocated toward platen 12. An outrigger support 31 carries a piston-cylinder clamp or brake 32 adapted to grip the depending plastic rope, a piston-cylinder assembly 33 adapted to reciprocate a clamp or chuck (see Figs. 4 and 5) designed to grip the plastic rope on its down stroke and to release its grip on its return stroke. A guide member 34 assists in properly positioning the lower end portion of the dependent plastic rope between the two mold parts 11 and 20 as shown in dotted line in Fig. 1. As shown in Figs. 4 and 5, the reciprocating stock feeding chuck may comprise a supporting frame 35 having parallel guide pins 36 and 37 along which a carriage 38 is adapted to be reciprocated through reciprocation of rod 39 in cylinder 33. The work clamping fingers 40 and 41 are pivotally mounted in carriage 38 and interconnected by a piston-cylinder assembly 42 adapted to be operated to move such fingers together into work clamping position as shown in Fig. 4 when rod 39 is extended and to spread such clamping fingers apart to release the work when rod 39 is retracted as shown in Fig. 5. It will thus be seen that the plastic rope 22 may be intermittently withdrawn from supply reel 21 in synchronism with the operation of the machine as explained more in detail below. A fluid pressure piston-cylinder brake 43 may be provided on standard 23 adapted to engage reel 21 abruptly to halt rotation of the latter in timed relation to the foregoing operations.

Referring now additionally to Figs. 6 and 7 of the drawing, these figures illustrate the operation of my novel stripping device utilized to eject the finished molded article from the opened mold. A pair of threaded rods 44 and 45 are carried by brackets 46 and 47 on the respective sides of reciprocable platen 6, such rods extending in the direction of movement of the platen. A crossbar 48 extends transversely through an opening in the die mount 49 carrying mold member 20, rods 44 and 45 passing through the ends of such bar with clearance affording provision for relative movement. Adjustably positioned lock nuts 50 and 51 are located to engage bar 48 during the final portion of the opening movement of the dies to shift such bar therewith and thereby cause ejector pin 52 mounted in the bar to be protruded from mold member 20 as shown in Fig. 7. Compression springs 53 and 54 are interposed between nuts 55 and 56 and bar 48 normally to hold such bar against nuts 50 and 51. When mold member 11 is, however, reciprocated into closed position as shown in Fig. 6, bar 48 is reciprocated therewith to the extent permitted by the opening in the male die mount, thereby retracating pin 52 prior to closing of the mold, the springs 53 and 54 being further compressed to accommodate the reciprocation of rods 44 and 45. This arrangement provides for the automatic stripping and ejection of the molded article at the preferred moment in the operating cycle without danger of damaging the article or the mechanism. Such mechanism is, moreover, capable of very rapid and precise adjustment.

The molding press is set up by first mounting mold members 11 and 20 in proper alignment on platens 6 and 12 and reciprocating platen 6 to mold closing position. Crank 18 is turned to reciprocate platen 12 into proper mold closing position, where it is left. A reel of the plastic rope stock is mounted on support 23 and the rope therefrom is passed over pulley 27 and threaded through the stock-feeding chuck or clamp. Nuts 50 and 51 are positioned on rods 44 and 45 to advance ejector pin 52 when platen 6 is fully retracted.

Now referring more particularly to Fig. 8 of the drawing, a complete cycle of operation of my new machine may be described. Such figure illustrates a suitable pneumatic pressure system, the air supply from line 57 passing through filter 58 and lubricator 59 to line 60 with which the various fluid pressure piston-cylinder assemblies are connected. For automatic operation a conventional timer will ordinarily be employed to energize the solenoid valves in the sequence described below. A double-acting solenoid valve 61 is first energized by starting timer T to admit air under pressure through line 62 to cylinder 3, thereby advancing rod 4 and reciprocating platen 6 toward mold closing position while exhausting cylinder 3 through line 63. The closing movement of the mold continues under the action of advancing piston rod 4, pinching off the dangling end of the plastic rope between the two mold members and tripping limit switch 64 to energize solenoid valve 65 and thereby admit air under pressure through line 67 to cylinder 28 to rock beam 25 from the Fig. 2 to its Fig. 1 position. Such movement of beam 25 trips limit switch 68 to energize solenoid valve 69 to admit fluid to line 70 and thereby retract rod 39 of cylinder 33 while simultaneously advancing the rope clamping piston 66 of cylinder 32 (thereby to prevent any movement of the rope while jaws 40 and 41 are open) and advancing the piston 67 to clamp cylinder 42 (see also Figs. 4 and 5). Accordingly, the clamping members 40 and 41 are moved apart and are shifted upwardly into position again to grip the rope of plastic molding material, such rope being temporarily held against movement by the action of cylinder 32. When clamp carriage 38 has risen to Fig. 5 position, it trips a limit switch 71 reversing valve 69 and thereby admitting air to line 72 and exhausting line 70 to reverse cylinders 32, 33, and 42 to feed a predetermined length of plastic rope downwardly in preparation for the next molding cycle.

Timer T now reverses solenoid valve 61 after completion of the pre-set curing time, admitting air to line 63 and exhausting line 62 to return rod 4 of cylinder 3 and thereby open the mold. At the end of the return stroke, limit switch 73 is engaged to restart the timer to repeat the cycle and also reverses solenoid valve 65 to admit fluid to line 74 and exhaust line 67 to advance rod 29 and thus lower the beam 25 to Fig. 1 position so that the dangling rope end previously advanced by cylinder 33 is in proper position between the mold parts.

To prevent over-running of reel 21, I provide pneumatic brake cylinder 43, the piston 75 of which is adapted to be pressed against the side of the reel. A lever arm 76 provided with counterweight 77 is pivoted at 78 below the reel where it will be engaged by any slack turn of the rope 22. Depressing lever 76 serves to actuate limit switch 79 and rising of such lever serves to actuate limit switch 80. Such operation of switch 79 energizes solenoid valve 81 to admit air to line 82 to advance brake plunger 75. Movement of lever 76 away from switch 79 until switch 80 is operated (indicating tightening of the rope on the reel) serves to reverse valve 81 to exhaust line 82 and admit air to line 83 to release the brake.

It will be seen from the foregoing that I have provided a novel molding machine particularly adapted to the utilization of continuous lengths of plastic molding material intermittently fed between the relatively reciprocable mold platens. Such machine may, moreover, be wholly automatic in operation, requiring attention only when the supply reel becomes exhausted. The stripper and ejector mechanism, while simple of adujstment and construction, is nevertheless automatically operative to perform its function at precisely the proper moment in the cycle of operation. A type of molding operation which was previously relatively laborious and time-consuming has accordingly been transformed into a much more efficient automatic and inexpensive process. A supporting pan may be provided, if desired, to support the span of the rope 22 between reel 21 and pulley 27.

Other modes of applying the principle of the invention may be employed, change being made as regards the details described, provided the features stated in any of the following claims or the equivalent of such be employed.

I therefore particularly point out and distinctly claim as my invention:

1. In a plastic molding machine having opposed complementary mold members mounted for relative movement toward and away from each other into and out of molding relationship, and means operative thus to reciprocate the same; a device operative to feed molding material into molding position comprising a reel of plastic molding material in continuous rope form mounted on a frame above said machine, a pulley also mounted on said frame and adapted to support a length of such rope withdrawn from said reel with its end dangling between said opposed mold members when the latter are spaced apart, means operative to rock said frame to elevate and lower said pulley and thus the portion of rope dangling therefrom, and means operative intermittently to advance further increments of rope from said reel to replace end portions thereof pinched off by closing movement of said mold members.

2. The machine of claim 1 including control means automatically operative to energize said mold member reciprocating means, said frame rocking means, and said rope advancing means in timed relation to each other to elevate said pulley after said mold member has been reciprocated to closed position, to advance such rope while said pulley is thus elevated, and to lower said pulley after said mold member has been reciprocated to open position.

3. The machine of claim 1, wherein said rope advancing means comprises a chuck adapted releasably to grip such rope and piston-cylinder means operative to reciprocate said chuck.

4. The machine of claim 1, including work ejecting means comprising a pin mounted for reciprocation in one said mold member parallel to opening movement of said molds, resilient means normally urging said pin to retracted position, and means connected with said other movable mold member for reciprocation therewith operative to advance said pin into work ejecting position when said latter member approaches fully opened position.

5. The machine of claim 1, including brake means for said reel, and control means for said brake adapted to apply said brake in response to development of a slack loop of rope on said reel and to release said brake in response to tightening of such loop.

6. In a plastic molding machine having cooperating mold members mounted for relative movement into and out of molding relationship, and means operative thus to move said members; feed means comprising a reel adapted to carry a long length of rope-like plastic molding material wound thereon, means operative to grip such rope, power means operative to drive said grip means intermittently to advance such rope withdrawing the latter from said reel, and means operative to move said grip means, reel and rope bodily toward and away from said mold members to interpose the leading end portion of such rope between said members when the latter are spaced out of molding relationship.

7. In a machine as defined in claim 6, control means operative to actuate said power means to advance such rope by withdrawing the same from said reel during the period said grip means, reel and rope are bodily spaced away from said mold members.

References Cited in the file of this patent

UNITED STATES PATENTS

| | | |
|---|---|---|
| 1,062,072 | Wilson | May 20, 1913 |
| 2,027,915 | Kux | Jan. 14, 1936 |
| 2,157,467 | Thurlings | May 9, 1939 |
| 2,351,582 | Bohrer | June 20, 1944 |
| 2,531,245 | Bailey | Nov. 21, 1950 |
| 2,541,249 | Hobson | Feb. 13, 1951 |
| 2,572,984 | Byers | Oct. 30, 1951 |
| 2,579,399 | Ruekberg | Dec. 18, 1951 |
| 2,584,712 | Jones | Feb. 5, 1952 |
| 2,629,132 | Willcox et al. | Feb. 24, 1953 |
| 2,629,897 | Mahla | Mar. 3, 1953 |

FOREIGN PATENTS

| | | |
|---|---|---|
| 882,240 | Germany | July 6, 1953 |